INVENTOR
JOSEPH JAFFE
BY Roy H. Davies
ATTORNEY though the following description is primarily concerned
United States Patent Office 3,546,094
Patented Dec. 8, 1970

3,546,094
HYDROTREATING CATALYST AND PROCESS
Joseph Jaffe, Berkeley, Calif., assignor to Chevron Research Company, San Francisco, Calif., a corporation of Delaware
Filed Aug. 5, 1968, Ser. No. 750,283
Int. Cl. C10g *13/00*
U.S. Cl. 208—59       13 Claims

ABSTRACT OF THE DISCLOSURE

A catalyst comprising a layered synthetic crystalline aluminosilicate cracking component, preferably substantially free of any catalystic metal or metals, a silica-alumina gel component, a Group VI hydrogenating component and a Group VIII hydrogenating component, and processes using said catalyst.

INTRODUCTION

Figure 1:
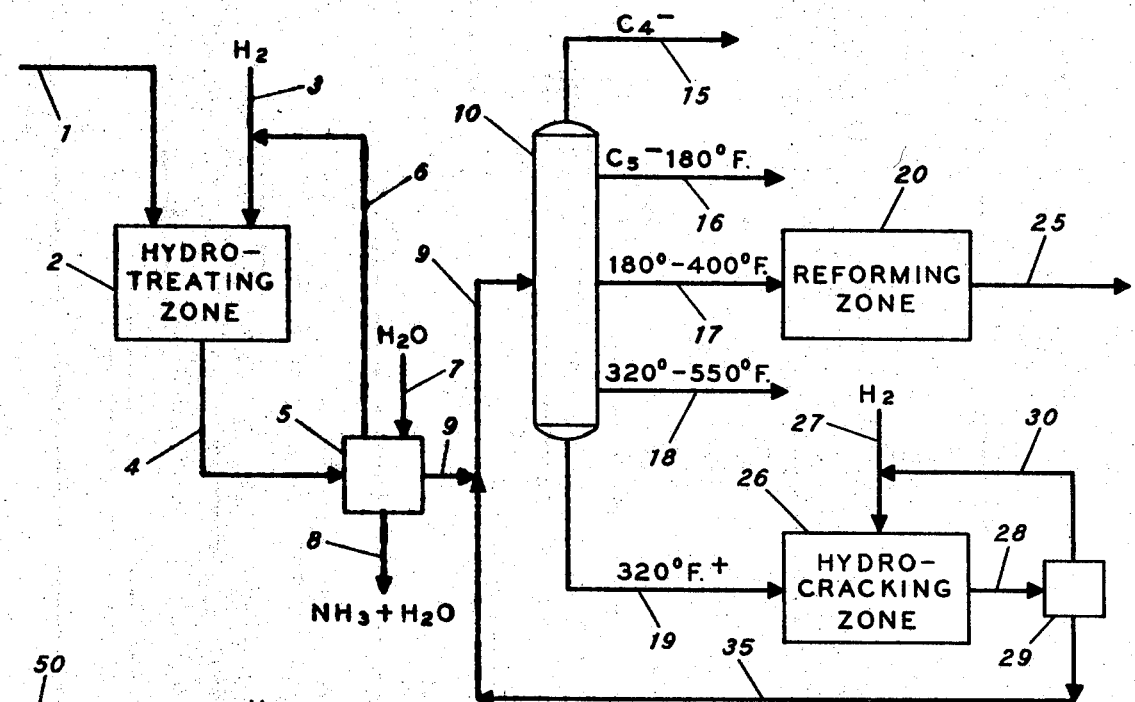

This invention relates to catalytic hydrocracking of petroleum distillates and solvent-deasphalted residua to produce high-value fuel products, including jet fuels and gasoline.

PRIOR ART

It is known that a catalyst may comprise a crystalline zeolitic molecular sieve component associated with other catalyst components. It is also known that at least some of said other catalyst components may be in the form of a matrix in which the molecular sieve component is dispersed. It is also known that such catalysts may be used for such reactions as catalytic cracking, hydrocracking, and hydrodesulfurization. Representative prior art patents disclosing one or more of the foregoing matters include: U.S. Pat. 3,140,251; U.S. Pat. 3,140,253; British Pat. 1,056,301; French Pat. 1,503,063, and French Pat. 1,506,793.

There has been a continuing search for further improvements in such catalysts, and in similar multicomponent catalysts, particularly for hydrocracking and hydrofining uses.

It is also known that a crystalline zeolitic molecular sieve cracking component, while relatively insensitive to organic nitrogen compounds and ammonia, has a well-ordered and uniform pore structure as a result of the crystal structure having bonds that are substantially equally strong in three dimensions. This provides definite limitations on the access of reactant molecules to the interiors of the pores.

It is also known, particularly from Granquist U.S. Pat. 3,252,757, that a relatively new layered crystalline aluminosilicate clay-type mineral that has been synthesized has the empirical formula

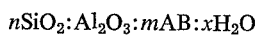

$$nSiO_2:Al_2O_3:mAB:xH_2O$$

where the layer lattices comprise said silica, said alumina, and said B, and where $n$ is from 2.4 to 3.0
$m$ is from 0.2 to 0.6
A is one equivalent of an exchangeable cation having a valence not greater than 2, and is external to the lattice,
B is chosen from the group of negative ions which consists of $F^-$, $OH^-$, $\tfrac{1}{2}O^{--}$ and mixtures thereof, and is internal in the lattice, and
$x$ is from 2.0 to 3.5 at 50% relative humidity, said mineral being characterized by a $d_{001}$ spacing at said humidity within the range which extends from a lower limit of about 10.4 A. to an upper limit of about 12.0 A. when A is monovalent, to about 14.7 A. when A is divalent, and to a value intermediate between 12.0 A. and 14.7 A. when A includes both monovalent and divalent cations. The equivalent of an exchangeable cation, A, in said mineral may be chosen from the group consisting of $H^+$, $NH_4^+$, $Li^+$, $K^+$, $\tfrac{1}{2}Ca^{++}$, $\tfrac{1}{2}Mg^{++}$, $\tfrac{1}{2}Sr^{++}$, and $\tfrac{1}{2}Ba^{++}$, and mixtures thereof.

Said layered synthetic crystalline aluminosilicate mineral (hereinafter referred to for brevity as "layered aluminosilicate"), in the dehydrated form, is known from U.S. Pat. 3,252,889 to have application as a component of a catalytic cracking catalyst; however, applications of said layered aluminosilicate, in either hydrated or dehydrated form, as a component of a hydrofining or hydrocracking catalyst have not been disclosed heretofore.

OBJECTS

In view of the foregoing, objects of the present invention include providing an improved catalyst comprising a cracking component associated with other catalyst components that has, compared with similar prior art catalysts:

(1) Improved hydrocracking activity;
(2) Improved hydrodenitrification activity;
(3) Improved hydrocracking stability;
(4) Improved hydrodenitrification stability, and
(5) A cracking component that is crystalline in structure, having pores elongated in two directions, contrary to the pores of crystalline zeolitic molecular sieves, and therefore having less reactant access limitations than the pores of such molecular sieves.

Further objects of the present invention include provisions of hydrocracking and hydrofining processes, and combinations thereof, using said improved catalyst, that are capable of producing high yields of excellent-quality jet fuel and other valuable fuel products.

The present invention will best be understood, and further objects and advantages thereof will be apparent, from the following description when read in connection with the accompanying drawing.

DRAWING

In the drawing, FIG. 1 is a diagrammatic illustration of apparatus and flow paths suitable for carrying out the process of several of the embodiments of the present invention, wherein the catalyst of the present invention is used on a once-through basis to concurrently hydrocrack and hydrodenitrify a hydrocarbon feedstock to produce more valuable products, some of which may be further upgraded by catalystic reforming or catalytic hydrocracking, if desired.

Figure 2:
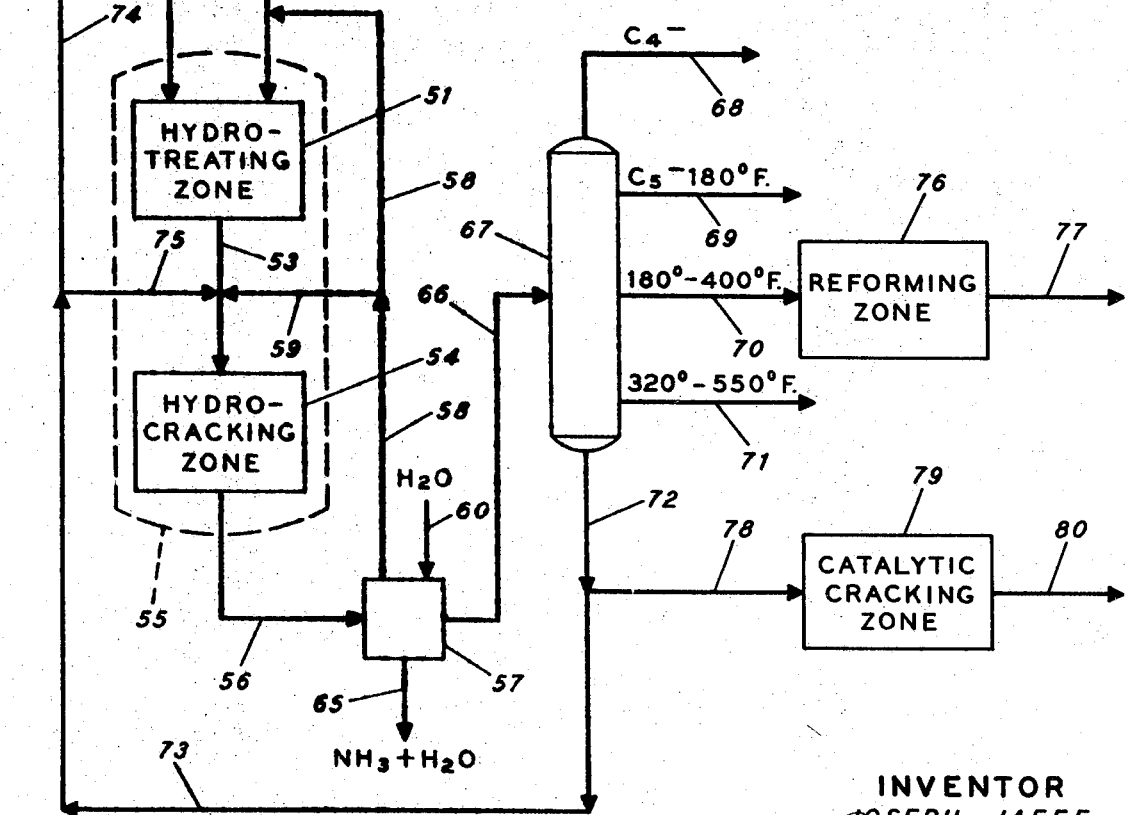

FIG. 2 is a diagrammatic illustration of apparatus and flow paths suitable for carrying out the process of additional embodiments of the present invention, wherein the catalyst of the present invention is used to concurrently hydrofine and hydrocrack a hydrocarbon feedstock, wherein the hydrofining-hydrocracking zone may be operated on a recycle basis, and wherein certain portions of the effluent from the hydrofining-hydrocracking zone may be catalytically reformed or catalytically cracked, as desired.

STATEMENT OF INVENTION

In accordance with the present invention, it has been found that the foregoing objects are achieved by a catalyst containing a unique combination of catalytic components in particular amounts, including silica, alumina, a Group VI component, a Group VIII component and a layered aluminosilicate component. In preferred embodiments of the preesnt invention, said layered aluminosilicate is present in said catalyst substantially in the ammonia or hydrogen form and is substantially free of any catalytic loading metal or metals.

More particularly, in accordance with the present invention there is provided a catalyst composite comprising:

(A) A gel matrix comprising:
(a) At least 15 weight percent silica,
(b) Alumina, in an amount providing an alumina-to-silica weight ratio of 15/85 to 80/20,
(c) At least one Group VIII component in the form of metal, oxide, sulfide or any combination thereof, in an amount of 1 to 10 weight percent, preferably 5 to 9 weight percent, of said matrix, calculated as metal,
(d) At least one Group VI component in the form of metal, oxide, sulfide or any combination thereof, in an amount of 5 to 25 weight percent, preferably 10 to 20 weight percent, of said matrix, calculated as metal,
(B) A layered aluminosilicate (preferably substantially in the ammonia or hydrogen form, substantially free of any catalytic loading metal or metals), said layered aluminosilicate further being in particulate form and being dispersed through said matrix.

Preferably, said catalyst composite will be further characterized by an average pore diameter below 100 angstroms and a surface area above 200 square meters per gram.

In a preferred embodiment, said catalyst further comprises titanium, zirconium, thorium or hafnium or any combination thereof, in the form of metal, oxide, sulfide or any combination thereof, in an amount of 1 to 10 weight percent, preferably 5 to 9 weight percent, of said matrix, calculated as metal. Titanium, preferably in the form of titania, is preferred.

Preferably said gel matrix comprises nickel as the Group VIII component and tungsten as the Group VI component, in the form of the metals, oxides, sulfides or any combination thereof. Said layered aluminosilicate may be present in an amount of 1 to 40 weight percent of said composite.

If desired, said catalyst composite may further comprise a crystalline zeolitic molecular sieve component in the amount of 1 to 40 weight percent, based on the total catalyst.

Still further in accordance with the present invention, there is provided a catalyst consisting essentially of:

(A) A porous Xerogel comprising:
(a) At least 15 weight percent silica,
(b) Alumina, in an amount providing an alumina-to-silica weight ratio of 15/85 to 80/20,
(c) Nickel, in the form of metal, oxide, sulfide or any combination thereof, in an amount of 1 to 10 weight percent, preferably 5 to 9 weight percent, of said Xerogel, calculated as metal,
(d) Tungsten, in the form of metal, oxide, sulfide or any combination thereof, in an amount of 5 to 25 weight percent, preferably 10 to 20 weight percent, of said Xerogel, calculated as metal,
(e) Titanium oxide, in an amount of 1 to 10 weight percent, preferably 5 to 9 weight percent, of said Xerogel, calculated as metal;
(B) A layered aluminosilicate, in an amount of 1 to 40 weight percent of said catalyst, said layered aluminosilicate preferably being substantially in the ammonia or hydrogen form, and preferably being substantially free of any catalytic loading metal or metals, said layered aluminosilicate further being in the form of particles, said particles being dispersed through said Xerogel.

Said catalyst having an average pore diameter below 100 angstroms and a surface area above 200 square meters per gram.

Still further in accordance with the present invention, there is provided a hydrotreating process which comprises contacting a hydrocarbon feed containing substantial amounts of materials boiling above 200° F. and selected from the group consisting of petroleum distillates, solvent-deasphalted petroleum residua, shale oils and coal tar distillates, in a reaction zone with hydrogen and the catalyst described above, at hydrotreating conditions including a temperature in the range 400° to 950° F., a pressure in the range 800 to 3500 p.s.i.g., a liquid hourly space velocity in the range 0.1 to 5.0 and a total hydrogen supply rate of 200 to 20,000 s.c.f. of hydrogen per barrel of feedstock, and recovering hydrotreated products from said reaction zone. The hydrocarbon feed may contain a substantial amount of organic nitrogen, because the catalyst of the present invention is extremely tolerant of organic nitrogen as well as of ammonia, and because the catalyst is an efficient hydrodenitrification catalyst. The catalyst will accomplish hydrodenitrification and hydrocracking concurrently and efficiently. The catalyst may be used as a hydrodenitrification catalyst in a zone proceeding a hydrocracking zone containing a similar or different hydrocracking catalyst. A superior jet fuel product may be produced when the catalyst is used for hydrocracking a suitable feedstock. A superior feedstock for a catalytic reformer also may be produced when the catalyst is used for hydrocracking. The hydrocracking zone effluent boiling above the gasoline boiling range, or boiling above the jet fuel boiling range when a jet fuel product is being recovered, may be catalytically cracked to produce additional valuable products.

The reference to a layered aluminosilicate "substantially free of any catalytic loading metal or metals" means that the layered aluminosilicate contains no more than 0.5 weight percent of catalytic metal or metals, based on the layered aluminosilicate. The catalytic metal or metals include the Group IV, VI and VIII metals, and exclude sodium.

It will be noted that the weight ratio of catalytic metal in the non-layered-aluminosilicate portion of the catalyst to catalytic metal in the layered aluminosilicate portion of the catalyst is high, in the preferred catalyst embodiment comprising a layered aluminosilicate substantially free of any catalytic metal or metals.

HYDROCARBON FEEDSTOCKS

The feedstocks supplied to the hydrofining-hydrocracking zone in the process of the present invention are selected from the group consisting of petroleum distillates, solvent-deasphalted petroleum residua, shale oils and coal tar distillates. The feedstocks contain substantial amounts of materials boiling above 200° F., preferably substantial amounts of materials boiling in the range 350° to 950° F., and more preferably in the range 400° to 900° F. Suitable feedstocks include those heavy distillates normally defined as heavy straight-run gas oils and heavy cracked cycle oils, as well as conventional FCC feed and portions thereof. Cracked stocks may be obtained from thermal or catalytic cracking of various stocks, including those obtained from petroleum, gilsonite, shale and coal tar. Because of the superior hydrofining activity and stability of the catalyst of the present invention, the feedstocks need not be subjected to a prior hydrofining treatment before being used in the hydrofining-dydrocracking process of the present invention. Feedstocks may contain as high as several thousand parts per million organic nitrogen, although preferably the organic nitrogen content will be less than 1000 parts per million organic nitrogen. Feedstocks also may contain several weight percent organic sulfur.

CATALYST COMPRISING A LAYERED ALUMINOSILICATE COMPONENT AND PREPARATION THEREOF (A) General.—The layered aluminosilicate component of the hydrofining-hydrocracking catalyst may be any catalytically active layered aluminosilicate, although the synthetic layered aluminosilicate of Granquist U.S. Pat. 3,252,757 is preferred for use in preparing the catalyst. The mineral becomes dehydrated during drying and calcination of the catalyst, as in the examples herein.

(B) Method of preparation.—The layered aluminosilicate component may be dispersed in a matrix of the other catalyst components by cogelation of said other components around said layered aluminosilicate component in a conventional manner.

The layered aluminosilicate component, substantially in the ammonia or hydrogen form, may be maintained substantially free of any catalytic loading metal or metals, in accordance with a preferred embodiment of the present invention, by dispersing it in a slurry of the precursors of the other catalyst components at a pH of 5 or above. When a sodium form of layered aluminosilicate is one of the starting materials, it may be converted to the ammonia or hydrogen form by ion exchange prior to being combined with the other catalyst components. Alternatively, it may be combined with the other catalyst components and then converted to the ammonia or hydrogen form by ion exchange. In either case, the layered aluminosilicate component should not be combined with the procursors of the other catalyst components at a pH below 5.

The finished catalyst may be sulfided in a conventional manner prior to use, if desired. If not presulfided, the catalyst will tend to become sulfided during process operation from any sulfur content that may be present in the hydrocarbon feed.

OPERATING CONDITIONS

The hydrofining-hydrocracking zone containing the catalyst of the present invention is operated at a temperature in the range 400° to 950° F., preferably 500° to 850° F., a pressure in the range 800 to 3500 p.s.i.g., preferably 1000 to 3000 p.s.i.g., a liquid hourly space velocity in the range 0.1 to 5.0, preferably 0.5 to 5.0, and more preferably 0.5 to 3.0. The total hydrogen supply rate (makeup and recycle hydrogen) to said zone is 200 to 20,000 s.c.f., preferably 2000 to 20,000 s.c.f. of hydrogen per barrel of hydrocarbon feedstock.

The operating conditions in the reforming zone and catalytic cracking zone employed in various embodiments of the present invention are conventional conditions known in the art.

PROCESS OPERATION WITH REFERENCE TO DRAWING

Referring now to FIG. 1 of the drawing, in accordance with one embodiment of the present invention, a hydrocarbon feedstock as previously described, which in this case may boil above 400° F. and which may contain a substantial amount of organic nitrogen compounds, is passed through line 1 into hydrofining-hydrocracking zone 2, which contains the catalyst of the present invention. The feedstock is hydrocracked in hydrocracking zone 2 at conditions previously described, in the presence of hydrogen supplied through line 3. Under these conditions, concurrent hydrodenitrification takes place to the extent that the feedstock is substantially denitrified. The effluent from zone 2 is passed through line 4 to separation zone 5, from which hydrogen separated from the treated feedstock is recycled through line 6 to zone 2. In zone 5, water entering through line 7 is used to scrub ammonia and other contaminants from the incoming hydrocarbon stream, and the ammonia, water and other contaminants are withdrawn from zone 5 through line 8. From zone 5, the scrubbed, hydrocracked materials are passed through line 9 to distillation column 10, where they are separated into fractions, including a $C_4^-$ fraction which is withdrawn through line 15, a $C_5$–180° F. fraction which is withdrawn through line 16, a 180°–400° F. fraction which is withdrawn through line 17, a 320°–550° F. fraction which is withdrawn through line 18, and a 320° F.+ fraction which is withdrawn through line 19. The $C_5$–180° F. fraction withdrawn through line 16 is a superior-quality light gasoline. The 180°–400° F. fraction withdrawn through line 17 is a superior catalytic reforming feedstock, which may be catalytically reformed in reforming zone 20, from which a superior catalytic reformate may be withdrawn through line 25. The 320°–550° F. fraction withdrawn through line 18 is a superior-quality jet fuel. The 320° F.+ fraction withdrawn through line 19 is a superior hydrocracking feedstock, which may be catalytically hydrocracked in hydrocracking zone 26 in the presence of a conventional hydrocracking catalyst and in the presence of hydrogen supplied to zone 26 through line 27. From hydrocracking zone 26, an effluent may be withdrawn through line 28, hydrogen may be separated therefrom in separator 29, and hydrogen may be recycled to hydrocracking zone 26 through line 30. Alternatively, said 320° F.+ fraction may be catalytically cracked in a catalytic cracking zone under conventional catalytic cracking conditions. From separator 29, hydrocracked materials may be passed through lines 35 and 9 to distillation column 10, where they may be separated into fractions, as previously described.

Referring now to FIG. 2, a hydrocarbon feedstock as previously described, which in this case may boil above 400° F. and which may contain substantial amounts of organic nitrogen compounds, is passed through line 50 to hydrofining-hydrocracking zone 51, containing the catalyst of the present invention. The feedstock is concurrently hydrofined and hydrocracked in zone 51 at conditions previously described in the presence of hydrogen supplied through line 52. The effluent from zone 51 may be passed through line 53 into hydrocracking zone 54, where it may be hydrocracked under the same conditions as used in zone 51, in the presence of a hydrocracking catalyst. The hydrocracking catalyst in zone 54 may be the same catalyst as used in zone 51, or may be a conventional hydrocracking catalyst, for example a hydrocracking catalyst comprising a silica-alumina gel cracking component or a crystalline zeolitic molecular sieve cracking component. If the catalyst in zone 54 is the same catalyst as in zone 51, or if it comprises a crystalline zeolitic molecular sieve cracking component, the effluent from zone 51 may be passed through line 53 into zone 54 without intervening impurity removal. If the hydrocracking catalyst in zone 54 does not contain a layered aluminosilicate or a molecular sieve component, it is preferred that interstage removal of ammonia and other impurities be accomplished between zones 51 and 54. Zones 51 and 54 may be located in separate reactor shells, which may be operated at different pressures. Alternatively, zones 51 and 54 may be separate catalyst beds located in a single pressure shell 55, and the effluent from zone 51 may be passed to zone 54 without intervening pressure letdown, condensation or impurity removal, particularly in the case where zone 54 contains the catalyst of the present invention or a conventional catalyst comprising a crystalline zeolitic molecular sieve component. The effluent from zone 54 is passed through line 56 to separation zone 57, from which hydrogen is recycled through line 58 to hydrofining-hydrocracking zone 51. All or a portion of the recycled hydrogen may be passed through line 59 to hydrocracking zone 54, if desired. In separation zone 57, water entering through line 60 is used to scrub ammonia and other contaminants from the incoming hydrocarbon stream, if these contaminants previously have not been removed between zones 51 and 54, and the ammonia, water and other contaminants are withdrawn from zone 57 through line 65. The effluent from zone 57 is passed through line 66 to distillation column 67, where it is separated into fractions, including a $C_4^-$ fraction which is withdrawn through line 68, a $C_5^-$ 180° F. fraction which is withdrawn through line 69, a 180°–400° F. fraction which is withdrawn through line 70, a 320°–550° F. fraction which is withdrawn through line 71, and a 320° F.+ fraction which is withdrawn through line 72. The fraction withdrawn through line 72 may be recycled through lines 73 and 74 to hydrofining-hydrocracking zone 51, and this is a preferred manner of operation. All or a portion of the fraction in line 73 may be recycled to hydrocracking zone 54 through line 75, if desired. The C$_5$–180° F. fraction withdrawn through line 69 is a superior-quality light gasoline. The 180°–400° F. fraction withdrawn through line 70 is a superior catalytic reforming feedstock, which may be catalytically reformed in reforming zone 76, from which a superior catalytic reformate may be withdrawn through line 77. The 320°–550° F. fraction withdrawn through line 71 is a superior-quality jet fuel. All or a portion of the 320° F.+ fraction withdrawn through line 72 may be passed through line 78 to catalytic cracking zone 79, where it may be catalytically cracked under conventional catalytic cracking conditions in the presence of a conventional catalytic cracking catalyst to produce valuable fuel products, which may be withdrawn from zone 79 through line 80.

EXAMPLES

The following examples are given for the purpose of further illustrating the catalyst of the present invention, the preparation thereof, and the use thereof in the process of the present invention. The examples are not intended to limit the scope of the present invention.

Example 1

A cogelled catalyst (Catalyst A) of the following composition was prepared:

| Component: | Wt. percent of total catalyst |
|---|---|
| NiO | 9.2 |
| WO$_3$ | 22.7 |
| TiO$_2$ | 7.2 |
| Al$_2$O$_3$ | 27.0 |
| SiO$_2$ | 23.9 |
| Layered aluminosilicate | 10.0 |
| Total | 100.0 |

The catalyst was prepared by the following steps, using sufficient quantities of the various starting materials to produce the above-indicated weight percentages of the components of the final catalyst:

(1) An aqueous acidic solution was prepared, containing AlCl$_3$, TiCl$_4$, NiCl$_2$ and acetic acid;

(2) Three alkaline solutions were prepared: (1) a sodium silicate solution; (2) a sodium tungstate solution; and (3) an ammonia solution containing sufficient excess ammonia so that upon combining the alkaline solutions with the acidic solution coprecipitation of all of the metal-containing components of the solutions would occur at a neutral pH of about 7.

(3) The acidic and alkaline solutions were combined, and coprecipitation of all of the metal-containing components of the solutions occurred at a pH of about 7, resulting in a slurry.

(4) A layered synthetic crystalline clay-type aluminosilicate in finely divided form was added to the slurry.

(5) the layered aluminosilicate-containing slurry was filtered to produce a layered aluminosilicate-containing hydrogel filter cake, which was washed repeatedly with dilute ammonium acetate solution, to remove sodium and chloride ionic impurities from the hydrogel and the layered aluminosilicate contained therein.

(6) The layered aluminosilicate-containing hydrogel was dried in an air-circulating oven and then was activated in flowing air for 5 hours at 950° F.

The finished catalyst was characterized by a surface area of 384 M.$^2$/g., a pore volume of 0.4 cc./g., and an average pore diameter of 42 angstroms (A.), and a layered aluminosilicate component substantially free of catalytic metals; that is, substantially all of the nickel, tungsten and titanium contained in the catalyst was located in the gel portion of the catalyst rather than in the layered aluminosilicate component thereof.

Example 2

A comparison cogelled catalyst (Catalyst B) was prepared exactly as in Example 1, except that a Linde sodium "Y" crystalline zeolitic molecular sieve component in finely divided form was used instead of a layered aluminosilicate, and prior to incorporation in the slurry the molecular sieve was presoaked in an ammoniacal solution of NiCl$_2$, to load the molecular sieve with nickel. The amounts of starting materials were selected to provide a final catalyst containing the same weight percentages of components as the catalyst of Example 1.

The catalyst thus differed from the catalyst of Example 1 only in that it contained a molecular sieve component instead of a layered aluminosilicate component, and the nickel contained in the catalyst was located both in the gel component and in the molecular sieve component.

Example 3

A cogelled catalyst (Catalyst C) was prepared exactly as in Example 1, except that no layered aluminosilicate component was incorporated therein. The amounts of starting materials were selected to provide a final catalyst with the same proportions of nonlayered aluminosilicate components as the catalyst of Example 1. The composition of the final catalyst was:

| Component: | Wt. percent of total catalyst |
|---|---|
| NiO | 10.2 |
| WO$_3$ | 25.2 |
| TiO$_2$ | 8.0 |
| Al$_2$O$_3$ | 30.0 |
| SiO$_2$ | 26.6 |
| Total | 100.0 |

It will be noted that the weight percentage of each non-layered-aluminosilicate component or nonmolecular sieve component of Catalysts A and B is 90% of the weight percentage of the same component of Catalyst C, the additional 10 weight percent of Catalysts A and B being contributed by the layered aluminosilicate component and the molecular sieve component, respectively.

Example 4

Portions of Catalysts A, B and C of Examples 1–3, respectively were separately used to hydrocrack separate portions of a California gas-oil feedstock, on a once-through basis.

The gas-oil feedstock had the following characteristics:

| | |
|---|---|
| Boiling range, ° F. | 500–900 |
| Gravity, ° API | 19 |
| Organic nitrogen content, p.p.m. | 3000 |

The hydrocracking conditions were:

| | |
|---|---|
| Total pressure, p.s.i.g. | 2500 |
| Total hydrogen rate, s.c.f./bbl. | 10,000 |
| Liquid hourly space velocity, v./v./hr. | 0.8 |
| Per-pass conversion to products boiling below 550° F., vol. percent | 60 |
| Starting temperature, ° F. | As indicated below |

The hydrocracking activities of the three catalysts, as measured by the starting temperatures necessary to achieve the indicated per-pass conversion, were:

| Catalyst: | Starting T, ° F. |
|---|---|
| A | 751 |
| B | 751 |
| C | 773 |

The 300°–500° F. jet fuel boiling range product in each case was of the same adequate quality, in that in each case the smoke point was 21 mm. and the freeze point was below —95° F.

From this example, it appears that: (1) the layered aluminosilicate-containing and molecular sieve-containing gel catalysts (Catalysts A and B) have hydrocracking activity superior to that of a catalyst (Catalyst C) that does not contain a layered aluminosilicate component or a molecular sieve component but that is otherwise identical; and (2) the gel catalyst (Catalyst A) containing a non-metal-loaded layered aluminosilicate component has hydrocracking activity equal to that of a gel catalyst (Catalyst B) that is identical except that it contains a metal-loaded molecular sieve component and no layered aluminosilicate component.

Example 5

The runs of Example 4 using Catalysts A and B were continued, except at a per-pass conversion of 70 volume percent to products boiling below 550° F. The yield of 300°–550° F. jet fuel was as follows:

300°–500° F. jet fuel yield, volume percent: Catalyst A, 55; catalyst B, 45.7.

From this example, it appears that the catalyst comprising a layered aluminosilicate (Catalyst A) had a markedly superior selectivity for the production of jet fuel than a similar catalyst (Catalyst B) containing a crystalline zeolitic molecular sieve component rather than a layered aluminosilicate component.

What is claimed is:

1. A catalyst composite comprising:
(A) A gel matrix comprising:
(a) at least 15 weight percent silica,
(b) alumina, in an amount providing an alumina-to-silica weight ratio of 15/85 to 80/20,
(c) a Group VIII component, in the form of metal, oxide, sulfide or any combination thereof, in an amount of 1 to 10 weight percent of said matrix, calculated as metal,
(d) a Group VI component, in the form of metal, oxide, sulfide or any combination thereof, in an amount of 5 to 25 weight percent of said matrix, calculated as metal;
(B) A layered crystalline clay-type aluminosilicate in particulate form, dispersed through said matrix, said crystalline aluminosilicate having, prior to calcination of said catalyst, the empirical formula $$nSiO_2:Al_2O_3:mAB:xH_2O$$

where the layer lattices comprise said silica, said alumina, and said B, and where $n$ is from 2.4 to 3.0
$m$ is from 0.2 to 0.6
A is one equivalent of an exchangeable cation having a valence not greater than 2, and is external to the lattice,
B is chosen from the group of negative ions which consists of $F^-$, $OH^-$, $\frac{1}{2}O^{--}$ and mixtures thereof, and is internal in the lattice, and
$x$ is from 2.0 to 3.5 at 50% relative humidity, said mineral being characterized by a $d_{001}$ spacing at said humidity within the range which extends from a lower limit of about 10.4 A. to an upper limit of about 12.0 A. when A is monovalent, to about 14.7 A. when A is divalent, and to a value intermediate between 12.0 A. and 14.7 A. when A includes both monovalent and divalent cations.

2. A catalyst composite as in claim 1, wherein said layered crystalline aluminosilicate is present in an amount of 1 to 40 weight percent, based on said composite.

3. A catalyst composite as in claim 1, wherein said layered crystalline aluminosilicate is substantially in the ammonia or hydrogen form, and is substantially free of any catalytic loading metal or metals.

4. A catalyst composite as in claim 1, wherein said gel matrix comprises nickel and tungsten, in the form of the metals, oxides, sulfides or any combination thereof.

5. A catalyst composite as in claim 1, further comprising titanium, zirconium, thorium or hafnium or any combination thereof, in the form of the metal, oxide, sulfide or any combination thereof, in an amount of 1 to 10 weight percent of said matrix, calculated as metal.

6. A catalyst composite as in claim 5, comprising titanium in the form of titania.

7. A catalyst composite as in claim 1, further comprising a crystalline zeolitic molecular sieve component in an amount of 1 to 40 weight percent, based on said composite.

8. A catalyst composite as in claim 1, characterized by an average pore diameter below 100 angstroms and a surface area above 200 square meters per gram.

9. A catalyst consisting essentially of:
(A) A porous Xerogel comprising:
(a) at least 15 weight percent silica,
(b) alumina, in an amount providing an alumina-to-silica weight ratio of 15/85 to 80/20,
(c) nickel, in the form of metal, oxide, sulfide or any combination thereof, in an amount of 1 to 10 weight percent of said Xerogel, calculated as metal,
(d) tungsten, in the form of metal, oxide, sulfide or any combination thereof, in an amount of 5 to 25 weight percent of said Xerogel, calculated as metal;
(e) titanium oxide, in an amount of 1 to 10 weight percent of said Xerogel, calculated as metal;
(B) A layer-type, clay-like crystalline aluminosilicate, in an amount of 1 to 40 weight percent of said catalyst, said crystalline aluminosilicate being in the form of particles, said particles being dispersed through said Xerogel, said crystalline aluminosilicate having, prior to calcination of said catalyst, the empirical formula $$nSiO_2:Al_2O_3:mAB:xH_2O$$

where the layer lattices comprise said silica, said alumina, and said B, and where $n$ is from 2.4 to 3.0
$m$ is from 0.2 to 0.6
A is one equivalent of an exchangeable cation having a valence not greater than 2, and is external to the lattice,
B is chosen from the group of negative ions which consists of $F^-$, $OH^-$, $\frac{1}{2}O^{--}$ and mixtures thereof, and is internal in the lattice, and
$x$ is from 2.0 to 3.5 at 50% relative humidity, said mineral being characterized by a $d_{001}$ spacing at said humidity within the range which extends from a lower limit of about 10.4 A. to an upper limit of about 12.0 A. when A is monovalent, to about 14.7 A. when A is divalent, and to a value intermediate between 12.0 A. and 14.7 A. when A includes both monovalent and divalent cations, said catalyst having an average pore diameter below 100 angstroms and a surface area above 200 square meters per gram.

10. A hydrotreating process which comprises contacting a hydrocarbon feed containing substantial amounts of materials boiling above 200° F. and selected from the group consisting of petroleum distillates, solvent-deasphalted petroleum residua, shale oils and coal tar distillates, in a reaction zone with hydrogen and the catalyst of claim 1, at hydrotreating conditions including a temperature in the range 400° to 950° F., a pressure in the range 800 to 3500 p.s.i.g., a liquid hourly space velocity in the range 0.1 to 5.0, and a total hydrogen supply rate of 200 to 20,000 s.c.f. of hydrogen per barrel of feedstock, and recovering hydrotreated products from said reaction zone.

11. A process as in claim 10, wherein said hydrocarbon feed contains a substantial amount of organic nitrogen, and wherein ammonia is removed from the effluent from said reaction zone.

12. A process as in claim 10, wherein a gasoline product and a jet fuel product are recovered from the effluent from said reaction zone.

13. A process as in claim 12, wherein a portion of the effluent from said reaction zone boiling above the gasoline boiling range is hydrocracked in a second reaction zone in the presence of hydrogen and a hydrocracking catalyst at hydrocracking conditions including a temperature in the range 400° to 950° F., a pressure in the range 800 to 3500 p.s.i.g., a liquid hourly space velocity in the range 0.1 to 5.0, and a total hydrogen supply rate of 200 to 20,000 s.c.f. of hydrogen per barrel of feedstock, and wherein at least one hydrocracked product is recovered from said second reaction zone.

References Cited

UNITED STATES PATENTS

| | | | |
|---|---|---|---|
| 3,132,087 | 5/1964 | Kelley et al. | 208—60 |
| 3,140,253 | 7/1964 | Plank et al. | 208—120 |
| 3,252,757 | 5/1966 | Grandquist | 208—120 |

DELBERT E. GANTZ, Primary Examiner

A. RIMENS, Assistant Examiner

U.S. Cl. X.R.

208—60, 89, 111; 252—455